United States Patent
Seol et al.

(10) Patent No.: US 8,582,017 B2
(45) Date of Patent: Nov. 12, 2013

(54) CAMERA SYSTEM WITH AUTO-FOCUS FUNCTION AND CONTROL METHOD THEREOF

(75) Inventors: Jin Soo Seol, Cheongju-si (KR); Byung Cheol Lee, Jinju-si (KR); Jong Pil Lee, Cheongju-si (KR); Doo Sik Shin, Suwon-si (KR)

(73) Assignees: Samsung Electronics Co., Ltd., Suwon-si (KR); Jahwa Electronics Co., Ltd., Chungbuk (KR)

(*) Notice: Subject to any disclaimer, the term of this patent is extended or adjusted under 35 U.S.C. 154(b) by 703 days.

(21) Appl. No.: 12/663,978

(22) PCT Filed: Jul. 17, 2008

(86) PCT No.: PCT/KR2008/004176
§ 371 (c)(1),
(2), (4) Date: Dec. 10, 2009

(87) PCT Pub. No.: WO2009/011547
PCT Pub. Date: Jan. 22, 2009

(65) Prior Publication Data
US 2010/0182490 A1 Jul. 22, 2010

(30) Foreign Application Priority Data
Jul. 18, 2007 (KR) .................. 10-2007-0071611

(51) Int. Cl.
*G03B 13/00* (2006.01)
*H04N 5/232* (2006.01)

(52) U.S. Cl.
USPC .................................. 348/345; 396/79

(58) Field of Classification Search
USPC ............. 348/208.11, 208.5, 208.7, 208.99, 348/345–357; 396/71, 79–82, 93–94, 139
See application file for complete search history.

(56) References Cited

U.S. PATENT DOCUMENTS

| | | | |
|---|---|---|---|
| 5,448,413 A * | 9/1995 | Kobayashi et al. | 359/698 |
| 5,900,995 A * | 5/1999 | Akada et al. | 359/824 |
| 2001/0012074 A1* | 8/2001 | Ohkawara | 348/358 |
| 2002/0135693 A1* | 9/2002 | Ohkawara et al. | 348/347 |
| 2003/0150973 A1* | 8/2003 | Misawa | 250/201.4 |
| 2004/0160518 A1* | 8/2004 | Park | 348/207.99 |
| 2007/0047942 A1* | 3/2007 | Chang et al. | 396/133 |
| 2007/0242152 A1* | 10/2007 | Chen | 348/345 |

FOREIGN PATENT DOCUMENTS

CN 1385749 A 12/2002
JP 2005-25055 1/2005

(Continued)

*Primary Examiner* — Nelson D. Hernández Hernández
(74) *Attorney, Agent, or Firm* — Jefferson IP Law, LLP

(57) ABSTRACT

In accordance with an aspect of the present invention a camera system comprising a lens module capable of linear movement in a direction of an optical axis; a drive portion generating for driving force to move said the lens module; a position sensor portion outputting a electrical signal to detect a position of the lens module; a image sensor portion outputting a electrical signal to capture image of a subject through the lens module; a control portion controlling the magnitude of driving force as the result that is judged by discriminating correct position to focus position of the lens module compared to real output and standard output of the position sensor corresponding to focus position of the subject to be detected as to output of the image sensor portion, wherein the control portion is composed of one chip.

8 Claims, 7 Drawing Sheets

(56) References Cited

FOREIGN PATENT DOCUMENTS

| | | |
|---|---|---|
| JP | 2005-122016 | 5/2005 |
| JP | 2005-233985 | 9/2005 |
| KR | 10-2006-0122125 A | 11/2006 |
| KR | 10-2007-0011941 A | 1/2007 |
| KR | 10-2007-0040547 A | 4/2007 |

\* cited by examiner

CAMERA SYSTEM WITH AUTO-FOCUS FUNCTION AND CONTROL METHOD THEREOF

TECHNICAL FIELD

The present invention is related to camera system with auto-focus function and control method thereof, and more particularly to camera system to control position of the lens module quickly in detail which used digital camera or telecommunication handset.

BACKGROUND ART

These days the development of digital camera system-making technique result in miniaturization and lightweight, the camera is more and more common for telecommunication handset.

The digital camera is improved to have high performance till 3M pixel, furthermore it is to be improved to commercialize 7M.

As the digital camera is improved to have high performance, various function such as optical zoom, auto focusing and image stabilizing function is adopted to the digital camera. Among the various function auto-focusing function is particularly adapted to the digital camera.

The method is used to convert rotation movement into linear movement by transforming device such as stepping motor or DC motor. However a driving unit is too large, so it is to solve the problem to meet technical evolution which the handset is to be miniaturization and slim.

Therefore, to solve this problem the method is adopted to shift the lens module such as voice coil motor, the driving principle of VCM is disclosed in Korean patent application laid-open No. 2006-0122125.

The method for using VCM can miniaturize space to occupy the driving portion, but there are various problems with realization of auto-focusing function.

It is adopted to open loop control type method which is to control the current to be applied to VCM according to the result of image signal to be transmitted from image sensor module, but in this case there is a problem not to supply clear image to user because the focus is not fitted to subject as a result of success or failure lens module to prompt shift to target position.

It is differ from not only assembly deviation in many articles, but also driving force used to shift lens module (same displacement) owing to self-weigh as shooting angle in same article. It always outputs same signals as same target position not to considerate difference in prior art.

In case the same current to be input lens driving part is controlled as same control signal, above mentioned focus of the subject is not fit because of difference on displacement shift in same article

DISCLOSURE

Technical Problem

Accordingly, the present invention has been made to reduce or overcome the above-mentioned problems occurring in the prior art and provides a camera which precisely controls the position of lens module by closed loop type controlling method in camera having auto focus function.

Another aspect of the present invention is to provide a camera which precisely controls the position of lens module at that times when deviation of driving force comes about owing to difference of shooting angle or assembly deviation in assembling process.

Another aspect of the present invention is to provide a camera which is able to shorten of auto focusing time as shortening of time to convergence at that position to specified position.

Technical Solution

In accordance with an aspect of the present invention a camera system comprising a lens module capable of linear movement in a direction of an optical axis; a drive portion generating for driving force to move said the lens module; a position sensor portion outputting a electrical signal to detect a position of the lens module; a image sensor portion outputting a electrical signal to capture image of a subject through the lens module; a control portion controlling the magnitude of driving force as the result that is judged by discriminating correct position to focus position of the lens module compared to real output and standard output of the position sensor corresponding to focus position of the subject to be detected as to output of the image sensor portion.

In case focus position of the lens module is not to be concluded correct position, the control portion repeat the first position control process that discriminate correct position to focus position of the lens module increasing or decreasing to setting magnitude of driving force till focus position of the lens module is to be concluded correct position The control portion controls driving force to continue present position in case focus position of the lens module is to be concluded correct position.

The control portion control the driving force according to setting routine to a position among a plurality of lens module including initial position and maximum position of the lens module and discriminate the output of the image sensor portion in movement, detect the focus position of lens module fitted to the focus position of a subject as the discriminating result.

The control portion control the magnitude of driving force generated in drive portion as discriminating the position of the lens module compared to real output and standard output of the position sensor corresponding to a position in case the lens module is moved to a position among a plurality of the lens module position.

The control portion repeat the second position control process that discriminate correct position to focus position of the lens module increasing or decreasing to setting magnitude of driving force till focus position of the lens module is to be concluded correct position in case focus position of the lens module is not to be concluded correct position.

The control portion control driving force to continue present position in case focus position of the lens module is to be concluded correct position.

The control portion save real output of the position sensor at a position among a plurality of the lens module position before detecting the initial position, and set output a plurality of lens module position as standard output adding initial standard position and variation of output through output saved position sensor portion as to the respective position of the lens module.

Respective standard output corresponding to the plurality of lens module position is saved, and the control portion compare real output and standard output of the position sensor corresponding to a position in case the lens module is moved to a position among a plurality of the lens module position, and calibrate standard output of respective position sensor corresponding to a plurality of lens module position in case the difference is more than the first setting range.

The control portion increase or decrease respective standard output of a plurality of lens module position as the difference of output in case standard output of position sensor portion is to be calibrated.

The initial position is the position of the lens module in case driving force is not activated, the maximum position is the position from the initial position to position to move maximum in case driving force is activated, and the setting routine is arranged in order variation compared initial position of a plurality of the lens module position.

The control portion don't move the lens module as to the position in case focus position is detected in a position The control portion conclude as focus portion or correct position, in case the difference standard output and real output of position sensor portion is in the second setting range.

The control portion is setting magnitude to be set to change in order when the first position control process or the second position control process.

The control portion is composed of one chip and control driving force as the quantity of current.

In accordance with an aspect of the present invention a camera system comprising a lens module capable of linear movement in a direction of an optical axis; a drive portion generating for driving force to move said the lens module; a position sensor portion outputting a electrical signal to detect a position of the lens module; a image sensor portion outputting a electrical signal to capture image of a subject through the lens module; a control portion controlling the magnitude of driving force as the result that is judged by discriminating correct position to focus position of the lens module compared to real output and standard output of the position sensor corresponding to focus position of the subject to be detected as to output of the image sensor portion, wherein the control portion is composed of one chip.

The camera system further comprise housing having the space to accommodate the lens module, the drive portion and the position sensor portion.

The housing comprising the first housing having the space accommodate the lens module, the drive portion and the position sensor portion and the second housing having the space accommodate the image sensor portion, wherein the second housing is situated on the lower part of the first housing to be arranged in a direction of an optical axis, a opening is on the upper surface and lower surface of the first housing and the upper surface of the second housing to assure shooting root of the image sensor portion.

The lower part of first housing integral to the upper part of second housing, and opening which is to be on the opening of lower surface of the first housing and the upper surface of the second housing are closed by infrared line filter.

The position sensor portion is hall sensor.

The drive portion arrange a coil in one potion among the lens module or the first housing, a magnet is arranged facing the coil in another portion among the lens module or the first housing.

The magnet is arranged to a side face, and the coil is arranged facing a side face of the lens module having a magnet in inner side surface of the first housing.

One first guide member is arranged in a side surface of lens module having the magnetic to guide the lens module in a direction of an optical axis, at least one second guide member is to be coming into the inner surface of the first housing having the coil confronting position to the first guide member.

A concave is extended in a direction of an optical axis at inner part of the first guide member and the second guide member, and a stopper is coming into moving range between maximum position and initial position in which are upper part and lower part of the second guide member, a ball is arranged to respective concave of the first guide member and the second guide member to roll in a direction of an optical axis.

The first penetrating hole and the second penetrating hole is respectively coming into the first guide member and the second guide member, and the lens module is inserted to the first penetrating hole and the second penetrating hole engaged the first housing by guide bar movable in a direction of an optical axis.

In accordance with an aspect of the present invention the auto focus control method which a lens module and a image sensor portion outputting electrical signal capturing a subject from the lens module comprising the first step that detect focus position of a substance as output through image sensor portion; and the second step that detect real output of position sensor moving the lens module to detected position at the first step, and discriminate correct focus position of the lens module comparing to real output of the position sensor and standard output corresponding to the focus position, and control position of the lens module as the discriminating result.

The auto focus control method further comprising the third step which repeat the third step that discriminate correct focus position of the lens module moving the lens module to setting displacement till the lens module to be fitted at focus position in case the lens module is concluded to be located correct position at the second step.

Present position of the lens module is to be continued in case the lens module is concluded to be located correct position at the second step.

Advantageous Effects

The camera of the present invention have advantage that precisely control position of the lens module adapting to closed loop control type comparing real output to standard output of position sensor contrary to the prior art using the open loop control type.

The camera of the present invention have advantage that precisely control position of the lens module because the camera respectively control according to the magnitude of driving force generated in the drive portion as to various case such as state of fabricating and assembly, shooting angle and effect of gravity that is to be generated by movement of lens module. Accordingly the camera of the present invention improve the yield of product and expense of quality control, decrease the loss.

The camera of the present invention has advantages that shorten the detecting time because the camera control precisely of the lens module. The camera of the present invention have advantage that convergence to control position of the lens module more quickly because control the magnitude of driving force comparing real output and pure standard output of the position sensor not performing complicated operation process in case of closed loop process

BEST MODE

The present invention will become more apparent by describing in detail exemplary embodiments thereof with reference to the attached drawings in which.

Figure 1:
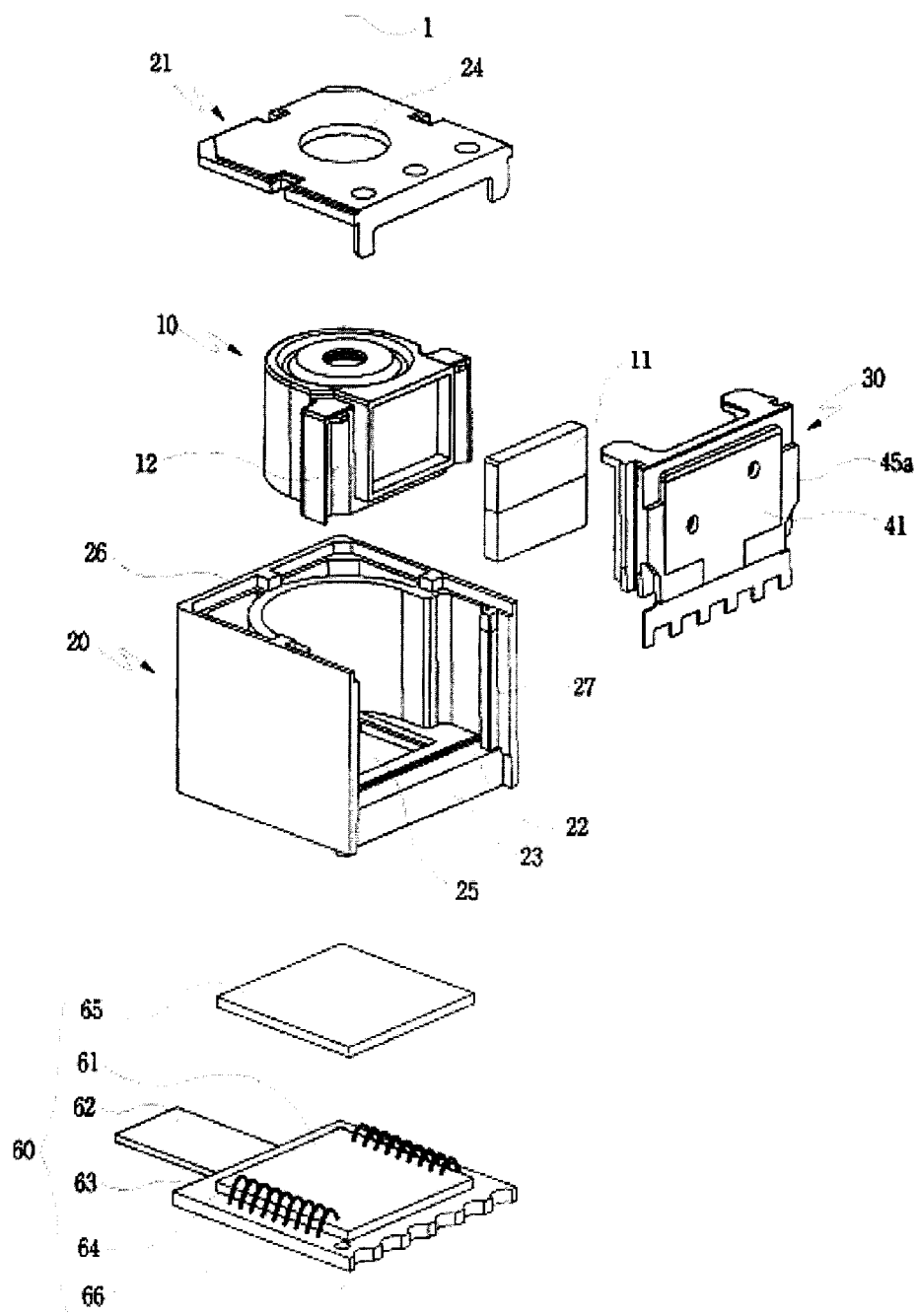
FIG. 1 is a exploded perspective view a camera system composition according to according to the first embodiment of the present invention.
Figure 2:
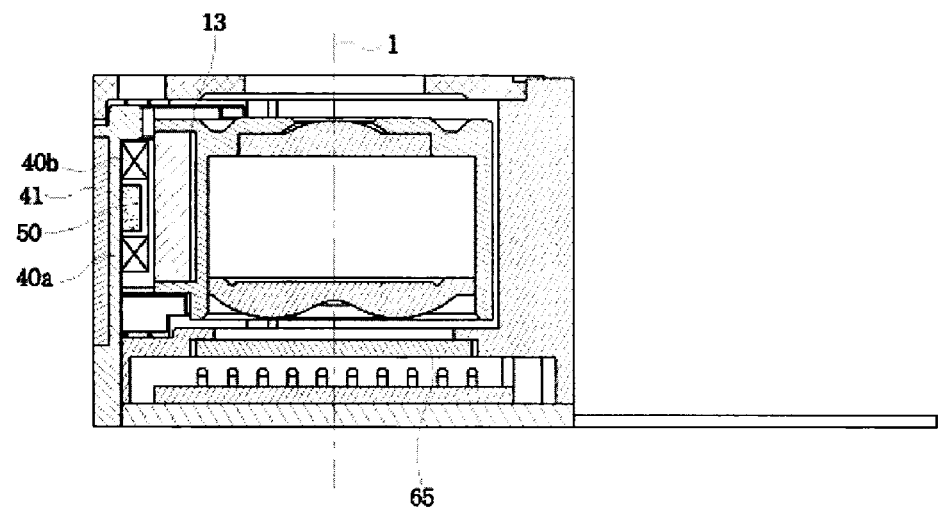
FIG. 2 is a cross-sectional view a camera system in assembled state according to the first embodiment of the present invention.
Figure 3:
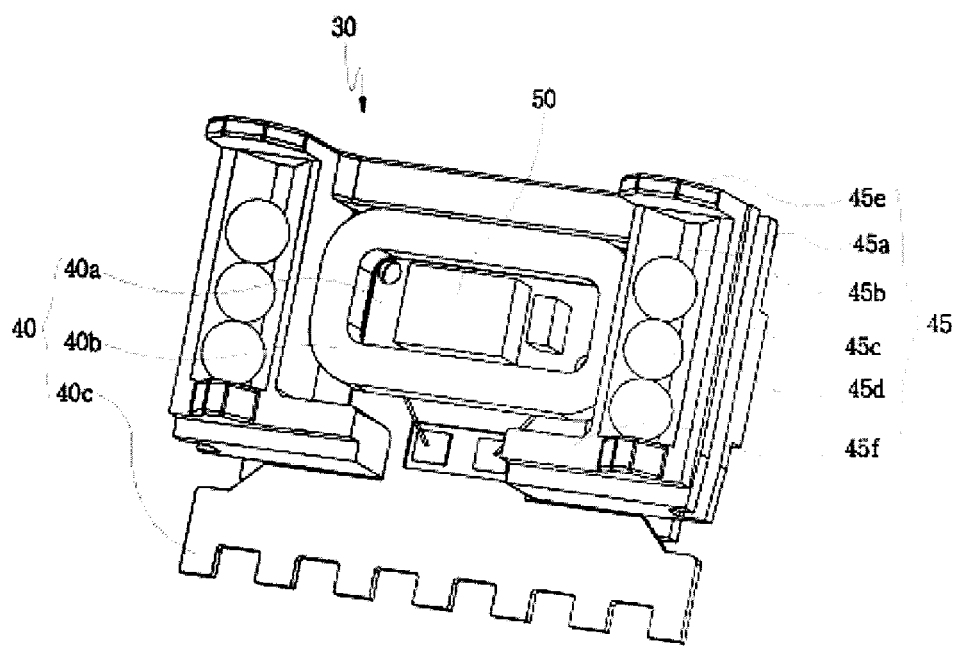
FIG. 3 is a perspective view a camera system showing the sustain panel composition according to according to the first embodiment of the present invention.

FIG. 1 is a exploded perspective view a camera system composition according to according to the first embodiment of the present invention. FIG. 2 is a cross-sectional view a camera system in assembled state according to according to the first embodiment of the present invention. FIG. 3 is a perspective view a camera system showing the sustain panel composition according to according to the first embodiment of the present invention.

Referring to FIG. 1 and FIG. 3 the camera comprising that lens module (10) having at least one lens in a direction of an optical axis (1), the first housing (20) accommodating the lens module (10) opened upper surface and a side surface having rectangular parallelepiped shape, the first housing cover (21) prohibiting from digressing of lens module (10) engaging with the upper surface of the first housing (20), support panel (30) having inner space to accommodate the lens module with the first housing cover (21) engaging with the opened side surface of the first housing (20), drive portion (40) moving the lens module (10) in a direction of an optical axis (1) accommodated in inner space of the first housing (20), hall sensor portion (50) detecting variation of the lens module (10) accommodated in inner space of the first housing (20), the second housing (23) extended in bottom surface (22) of the first housing (20) having rectangular parallelepiped shape departed of the first housing (20) through bottom surface (22) and image sensor module (60) accommodated in inner space of the first housing (20).

The image sensor module (60) comprising image sensor (61), flexible printed circuit (62) and circuit board (63). The image sensor (61) to be arranged in image surface equipped on circuit board (63) by boding, the flexible printed circuit connected to main circuit board (not shown) of camera or handset extended in the circuit board (63). At this time the first opening (24) and the second opening (25) is respectively formed at the first housing cover (21) and the bottom surface (22) of the first housing. The edge part of circuit board (63) have saw-like wire bonding soldering (66) to fix with drive portion circuit board (40a).

The second housing (23) is opened to bottom surface and fixed to circuit board (63) covering image sensor (61). At this time image sensor (61) detect the image provided by infrared filter (65) because the second opening (25) is closed by infrared filter (65). The image sensor (61) is arranged with infrared filter (65) and the lens module (10) in a direction of an optical axis (1).

The inner space of not-opened side surface of lens module guide (26) is formed covering lens module to inhibit from missing in a direction of an optical axis, and the lens module (10) is guided along in a direction of an optical axis (1).

The assembly projection (27) is formed at respective edge portion adjacent to opened side surface to be assembled to support panel (30). At this time the assembly projection (27) extended to sufficient length to be assembled to support panel (30) parallel to optical axis (1) not leaning.

Above mentioned that the first housing integral to the second housing for a instance, but to be assembled to depart capable of assembling. Above mentioned that the first housing (20) and the second housing (23) is formed as rectangular parallelepiped shape for a instance, but to be assembled to another shape.

The lens module (10) control the focus length moving in a direction of an optical axis (1) in a inner space of the first housing (20), and the magnet (11) is reclaimed for a side surface of the lens module (10) confronting to the support panel (30). At this time polarity of the magnet (11) is departed in a perpendicular direction of an optical axis (1). The first guide (12) is extended to respective side having trench "V". And the first guide (12) and the second guide (45b) guide the lens module (10).

The support panel (30) engaged in the drive portion (40) arranged in center part and support portion (45) supporting the lens module (10) in a inner space of the first housing (20).

The support portion (45) cover the drive portion (40). The second guide (45b) having V-shaped trench inner part protrude from both side of the bottom surface (45a) in support part confronting to the first guide (12). The assembly groove (45c) is formed at the outer surface of the second guide (45b) in the position confronting to the assembly projection (27). Therefore above mentioned assembling the first housing (20) and the support panel (30) is good to work in assembling the camera.

At this time the second guide (45b) has at least one ball (45d), therefore linear movement of the lens module is more easy.

The upper stopper (45e) and The lower stopper (45f) is extended from upper edge and lower edge of the bottom surface (45a) of support portion along extending direction of the second guide (45b).

The drive portion (40) include drive portion printed circuit (40a) and the coil (40b) fixed to printed circuit board (40a). When current is applied to the coil (40b), an electromagnetic field is generated around the coil (40b). The electric field and magnetic field generated by magnet (11) react together and generate driving force in a direction of an optical axis (1) under the Fleming's right hand rule.

At this time the first yoke (13) is mounted between the lens module (10) and the magnet (11) to induce magnetic field of the magnet (11) along the direction of drive portion (40), the second yoke (41) is mounted below the lower part of drive portion printed circuit fixed to coil (40b) to induce electric field of the coil (40b) along the direction of magnet (11).

The drive portion printed circuit (40a) has terminal (40c) of the drive portion printed circuit (40a) to engage with circuit board (63) of the image sensor module (60) as above mentioned.

The hall sensor portion (50) is mounted on the drive portion (40) to detect the displacement of the lens module. The hall sensor is adapted as sensor to detect the displacement of the lens module in this example, but sensor is not defined by hall sensor, as a occasion demands a sensor known to public such as light sensor is able to be adapted.

The hall sensor portion (50) detect the variation of the position of the magnetic mounted on the lens module and output voltage signal. The hall sensor portion (50) is mounted on the drive portion printed circuit (40b) Being covered with the coil (40b) to increase efficiency of space. At this time the hall sensor portion (50) is electrically provided by the drive portion printed circuit (40b) and transfer voltage signal to the drive portion printed circuit (40) as the displacement to the lens module (10)

The hall sensor portion (50) detecting displacement of the lens module (10) and the control portion controlling the current of the drive portion (40) coil (40b) as output of the hall sensor portion (50) are integrated one chip, as above mentioned the hall sensor (50) and the control portion (100) are integrated one chip the degree of using the space is raised and decrease the length of wire and minimize the effect of the noise in controlling of the focus position.

In case the restriction of the space is not hard, the hall sensor portion (50) and the control portion (100) is separated and is capable of mounting the drive portion (40) and image sensor module (60) separated from the control portion (100).

Figure 4:
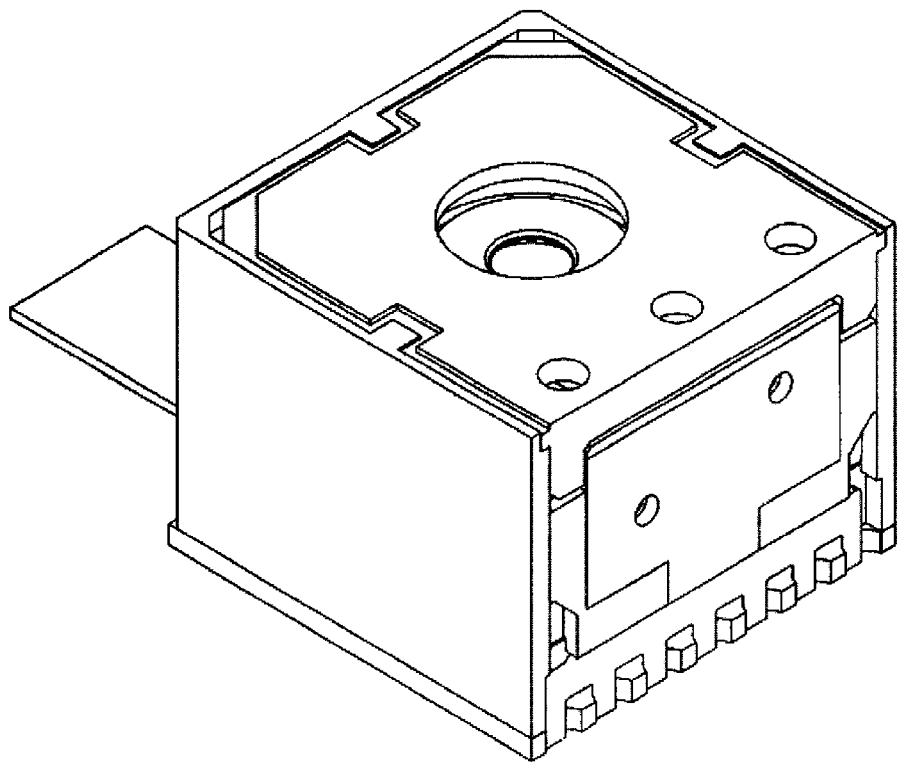
FIG. 4 is a perspective view a camera system according to according to the first embodiment of the present invention.

FIG. 4 is a perspective view a camera system according to according to the first embodiment of the present invention. hereinafter the operating of the camera will be described.

The camera lens module (10) according to the first embodiment of the present invention in initial state is in contact with the magnet (11) and the second yoke (41) according to the attraction force in a direction to the drive portion (40), at the same time the magnet (11) is moved to the center of the second yoke (41) and the lens module (10) is in contact with the lower stopper (45f)

That is to say the lens module (10) in a initial state is at a stop in the position where the reclaimed side surface of the magnet (11) confront the second yoke (41) and the lower part is in contact with the upper stopper (45f). At this time the initial state is the state not to be applied to the drive portion, the lens module (10) is not activated driving force. In case the contacting force to be contacting with the lower portion of the lens module and the lower stopper, the contacting force is increased to mount the member having magnetic force at the lower stopper (15f) and to extend the second yoke (41) in a direction to the lower stopper (45f).

In a initial state if the current is applied to the drive portion (40) coil (40b) is generated by Fleming's right hand rule and the lens module (10) is moved to in a direction of an optical axis (1). The displacement of the lens module (10) is decided according to the magnitude of the current applied to the coil (40b) and the focus distance is to be controlled.

At this time, as above mentioned the lens module (10) is attracted to the drive portion, this attraction activate interrupt the movement of the lens module (10) in a direction of an optical axis (1).

At least one ball (45d) is equipped between the first guide (12) and the second guide (45b) and less driving force can drive the lens module (10) as rolling activation in moving the lens module (10).

The concave of the first guide (12) and the second guide (45b) are V-shape, and the ball (45d) can roll along the concave. The first guide (12) and the second guide (45b) guide the lens module (10) in a direction of an optical axis (1) with the lens module guide (23), the shape of concave is "V", but as occasion demands the shape of concave can adapt various shape.

the size of the ball (45d) is formed to contact inner face of concave in the first guide (12) and the second guide (45b) and selected to maintain no to contacting the lens module (10) and the drive portion (40) at the same time.

If the current applied to drive portion (40) coil (40b) is to be cut, the driving force vanish. Therefore the lens module (10) is returned to the initial state because of gravity and the attracting force between the magnet (11) and the second yoke (41).

Figure 5:
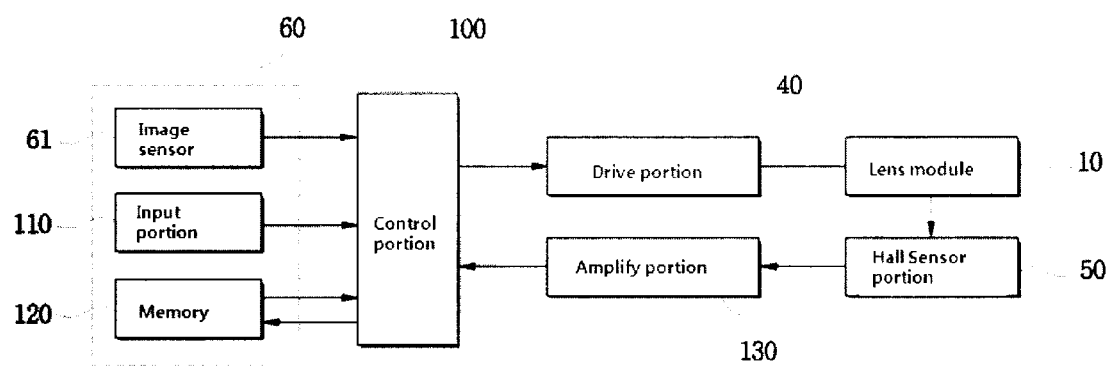
FIG. 5 and FIG. 6 are block diagram illustrating a camera system activating composition according to the first embodiment of the present invention.
Figure 6:
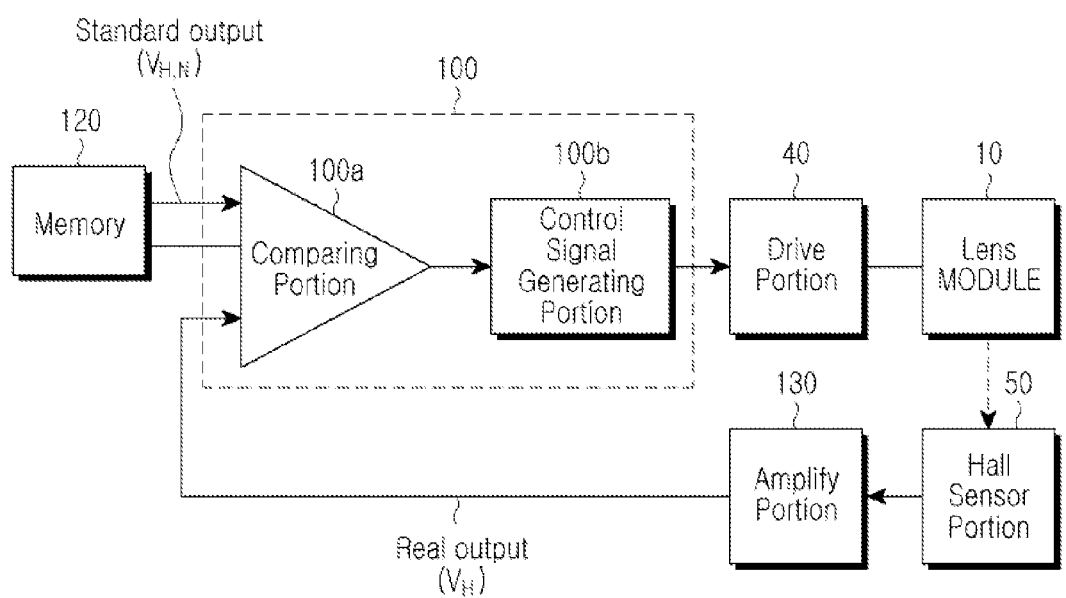

FIG. 5 and FIG. 6 are block diagram illustrating a camera system activating composition according to the first embodiment of the present invention. As shown FIG. 5, If the control signal photographing a subject by user is inputted to the input portion (110), the control portion (100) transfer the control signal to the drive portion (40) along predetermined algorithm of the memory (120) and control the position of the lens module (10).

The control portion (100) detect the focus position of a subject using the image signal transferred from image sensor (61) along the variation of the position of the lens module (10) and save detected focus position to the memory (120)

In case of detecting the focus position the control portion (100) transfer control signal to the drive portion (40) and perform auto focus function. As shown FIG. 5 the image sensor module (60) has the input portion (110) and the memory (120), but as occasion demands they are to be composed respectively.

As above mentioned in case the control portion (100) is transferred to the signal to control the lens module, as shown FIG. 6 the variation portion (100a) of the control portion (100) detect predetermined standard output ($V_{H,N}$) in the memory (120) of the hall sensor portion (50) and the displacement of the lens module (10), compare real output ($V_H$) and the control signal generating portion (100b) transfer control signal (current signal to increase or decrease) to control portion (40) as the result comparing output.

On occasion demands as shown FIG. 5 and FIG. 6 real output of the hall sensor portion (50) is amplified to predetermined ratio from amplify portion (130) and is transferred to the control portion (100).

Figure 7:
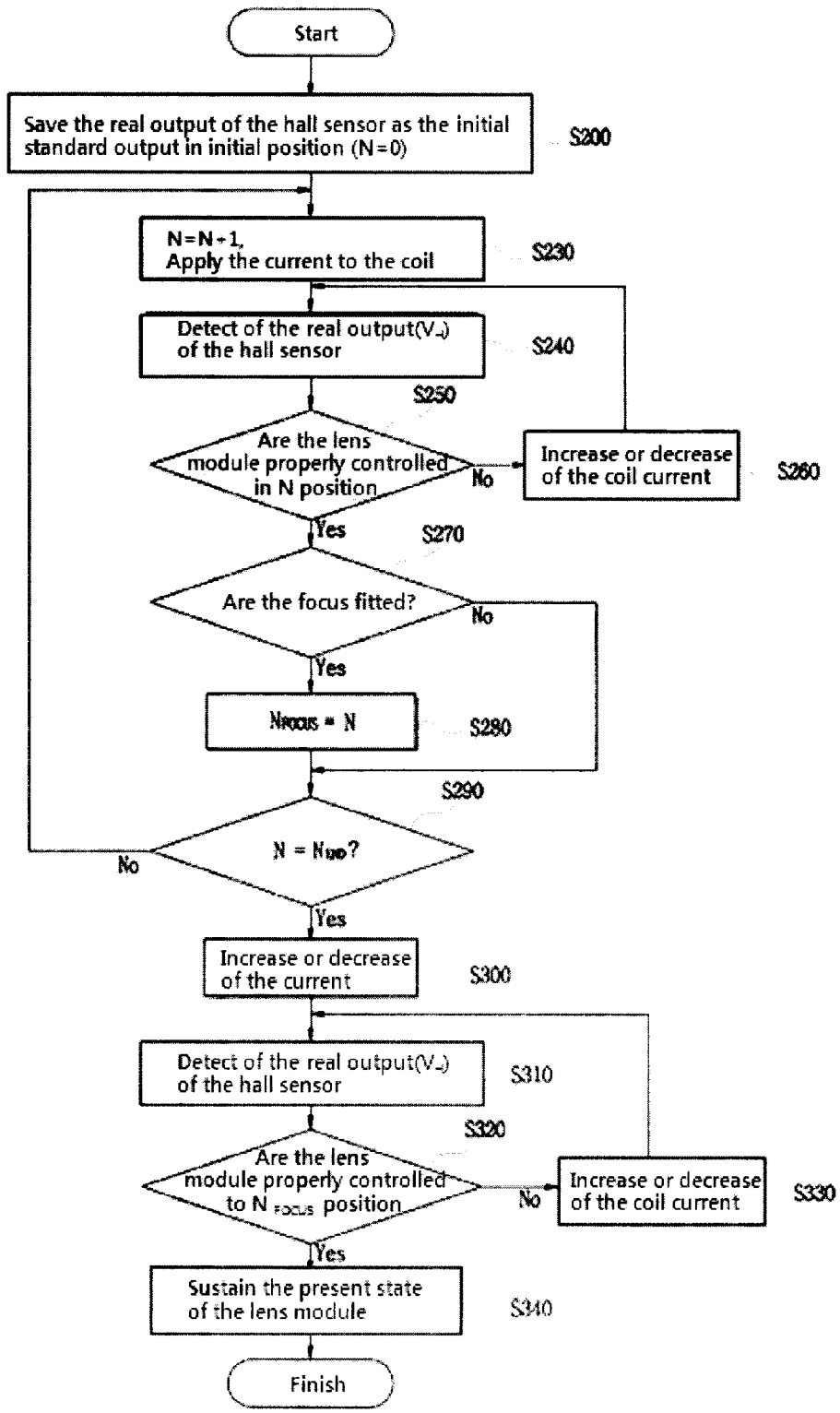
FIG. 7 and FIG. 8 are block flow chart illustrating control method of auto focus in camera system according to the first method and the second method in the first embodiment of the present invention.

FIG. 7 is block flow chart illustrating control method of auto focus in camera system according to the first method in the first embodiment of the present invention. The auto focus function of the camera the focus position detect step that detect the focus position of a subject and the lens module move step that move the lens module (10) to detected focus position, hereinafter respective steps will be described.

In the focus position detect step if the input portion (110) is inputted to control signal to photograph a subject by user, the control portion (100) detect real output ($V_H$) of the hall sensor portion (50) in the initial state (N=0) of the lens module (10) and save the initial standard output (S200)

In this embodiment the S200 step is performed in the N=0 position, initial state, as occasion demands the said step is performed in another position. At this time initial position is the position of the lens module (10) mentioned above state (that is to say not activating driving force).

In case the S200 step is finished, the control portion (100) add the predetermined output variation of the hall sensor portion in the memory corresponding respectively a position (N=0, N=1, N=2, . . . , N=$N_{END}$) existing between initial position (N=0) of the lens module (10) and the maximum position (N=$N_{END}$) and initial standard output saved in the S200 step and set the standard output of the hall sensor portion (50). At this time in case of activating driving force the maximum position is meaning to the position to move maximum from the initial position of the lens module (10).

In S200 step the fabricate variation and the assembly variation is considered to the respective article and component in auto focusing besides prior art, so precise auto focus is performed.

If initial standard output is set to the same value as to respective article the standard output of the hall sensor portion (50) as to respective article is the same value. But really real position of the lens module (10) as to the same standard output is different because the fabricate variation and the assembly variation is generating to respective articles.

Therefore a division of the focus position is not detected by the control portion (100), ultimately the article is judged to inferior article in manufacturing line and lower the yield.

To solve the above-mentioned problems in this embodiment the initial standard output is detected directly to considerate the fabricate variation and assembly fabricate in performing auto focus function, add the initial standard output and the magnitude of output variation, set the standard output at respective control position corresponding to the characteristic of fabricating and assembling articles. Therefore expense inspecting quality and error ratio is decreased and the yield of the manufacturing line is improved.

If the S200 step is finished, the control portion (100) transfer control signal to the drive portion (40) and at this time the magnitude of the current applied is calculated and saved to the memory.

If the S 300 step is finished, the control portion (100) detect the real output ($V_H$) of the hall sensor portion (50), compare real output ($V_H$) and the standard output ($V_{H,N=1}$, that is to say the sum predetermined output variation ($\Delta V_{H,N=1}$) in memory (120) corresponding to the position at N=1 and the initial standard output) and judge the correct position of the lens module (10) in the position at N=1 (S250)

In the S 250 step the control portion (100) judge correct position of the lens module (10) in case the value of real output ($V_H$) and the standard output ($V_{H,N=1}$) is the same, if the value of real output ($V_H$) is in a range of predetermined value as the center of the standard output ($V_{H,N=1}$), the control portion (100) is judged to correct position.

In the S 250 in case the position of the lens module (10) is not correct, the control portion (100) output control signal to increase or decrease of the current applied to the coil (40*b*) to dive portion (40).

In this process for example if position of the lens module (10) not yet arrived at the position N=1, the control portion (100) increase the current and the driving force activating the lens module (10) is to be increased, if position of the lens module (10) passed by the position N=1, the control portion (100) decrease the current and the driving force activating the lens module (10) is to be decreased.

The increasing magnitude or decreasing magnitude of the current is set to be same value at respective control step, or is set to change in order of precedence to each control step.

In this embodiment the method of auto focusing control in camera have the advantage that position of the lens module (10) because the method is comparing the standard output of the hall sensor portion (50) and being close loop type that control of position of the lens module (10) to be in predetermined error range or to be same value besides prior art, open loop type.

In this embodiment the method of auto focusing control in camera position of the lens module (10) is to be controlled correctly because the control portion (100) control differently by above mentioned applied to the coil (40*b*) in various case such as structural friction force activating of the lens module movement or the gravity effecting the lens module as to shooting angle is same article. And therefore expense inspecting quality and error ratio is decreased and the yield of the manufacturing line is improved.

In S 250 step, in case the lens model is correctly positioned at the N=1 the control portion (100) judge fitting of the image signal focus transferred from the image sensor module (60).

The control portion (100) can judge fitting of the focus as disclosed type, in this embodiment the control portion (100) judge fitting of the focus to detect phase difference to use image signal transferred from image sensor, the phase difference detecting type is the method that the light of providing by the lens module from a subject is to be separated and judge the fitting of the focus. This method is disclosed broadly by those skilled in the art.

In S270 in case the focus is fitted the control portion (100) save the present position (N=1) as the focus position (N=$N_{END}$) and perform the S 230 step position of the lens module to be arrive the maximum position (N=$N_{END}$) (S280, S290) and incase of not fitting the S 290 step is performed.

In this embodiment in case the focus position is saved, the control portion (100) move the lens module (10) to the maximum position in phase and repeat the S 230 step. As occasion demands to decrease the detecting time of focus position focus position is to be finished if the focus position is detected, and perform the lens module move step.

In this performing process, auto focus control method in camera according to the embodiment the control portion (100) is not equipped with calculating portion comparing complicated calculating process, and is equipped with comparing portion (100*a*) compare the magnitude of the standard output and real output. Because the complicated calculating process is omitted and the expense is decreased and the lens module is converged to the control position more quickly.

In case the position of the lens module is not correct the number of the respective position is increased and detect all range to avoid not detecting case, in this embodiment the auto focus control method in camera is the method that the number of the respective position is decrease because precisely position control of the lens module is capable, and the decreasing quantity of number of the N is concluded to shorten the detecting time because of credibility as the same level.

Accordingly auto focus control method in camera according to the embodiment is able to adapt camera shortening the shooting time or continuous shooting such as image communication.

Hereinafter the lens module move step is described that the lens module is moved to detected focus position.

As the S200 step and S290 step if the detecting of the focus position is finished the control portion (100) transfer control signal to the drive portion (40) to move the lens module (10) to detected focus position (N=$N_{FOCUS}$), the drive portion (40) as this the current is applied to the coil (40*b*). At this time the magnitude of the current as above mentioned is desirable for the memory (120) to save the focus position (N=$N_{FOCUS}$)

If S300 step is finished the control portion (100) detect of the real output ($V_H$) of the hall sensor portion (50), detected real output is compared to the standard output corresponding to N=$N_{FOCUS}$ position.

In S320 step the method the control portion (100) to judge of correct position is the same as S200 and S290.

In S320 step if the lens module (10) is not correct the control portion (100) transfer image signal to the coil (40*b*) to increase or decrease the magnitude of the current, and repeat the S310 step.

At this time the method control portion (100) increasing or decreasing of the magnitude of the current is the same method.

In S320 step judged the position of the lens module (10) is correct at N=$N_{FOCUS}$ position the control portion (100) perform control to maintain of the lens module position till completing to photograph a subject.

Figure 8:
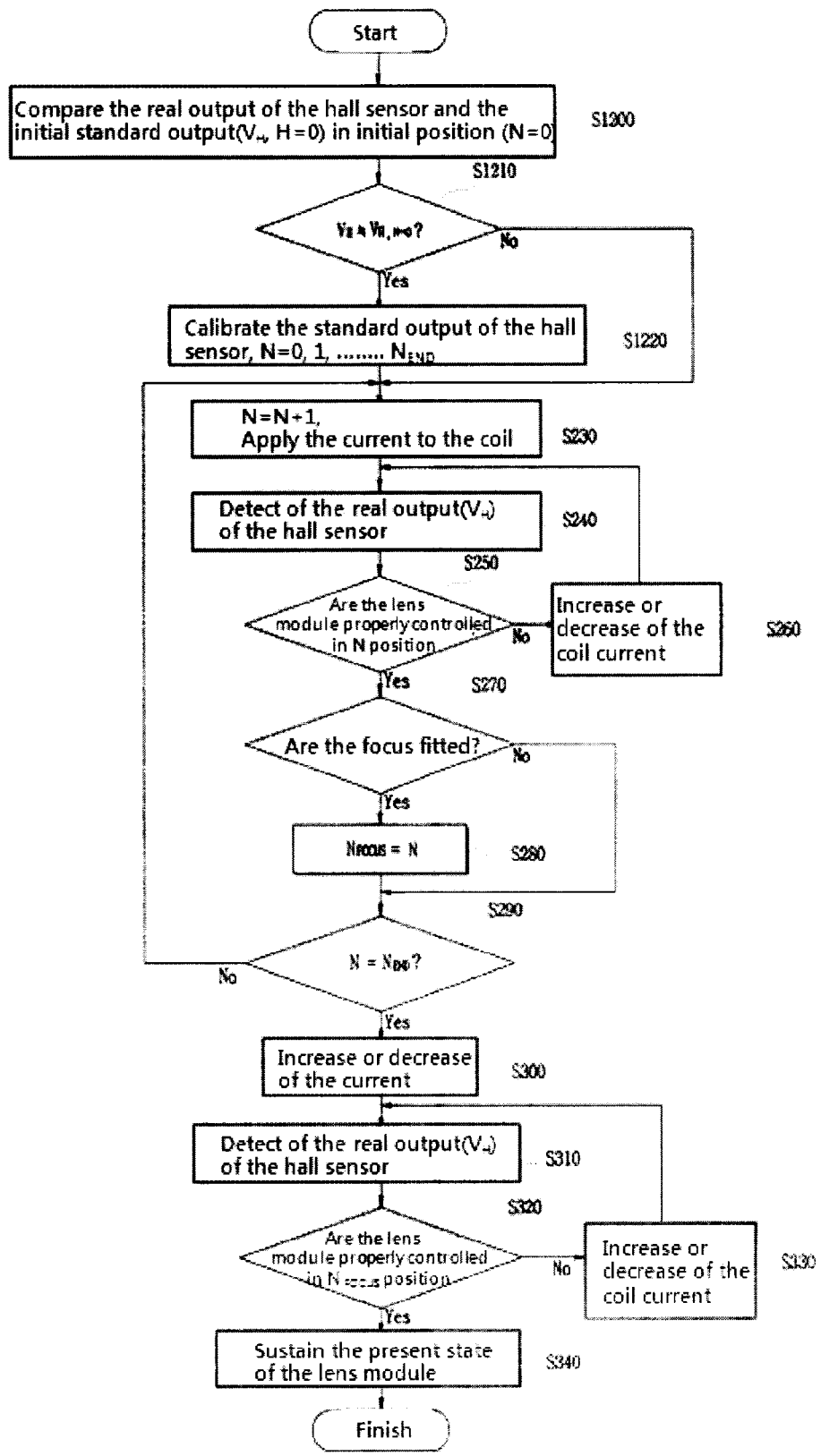

FIG. 8 is block flow chart illustrating control method of auto focus in camera system according to the second method in the first embodiment of the present invention.

The control method of auto focus in camera system according to the second method If the control signal is to be inputted to the input portion (110) to photograph a subject to use a camera by user the control portion (100) detect real output ($V_H$) of the hall sensor portion (100) at initial position (N=0) of the lens module (10) and compare with the standard output ($V_{H,N=0}$) predetermined to the memory corresponding to initial position (S1200, S1200)

In S1210 step in case the real output and the standard output is different the control portion (100) is located a position (N=0, N=1, N=2, . . . , N=$N_{END}$) between initial position (N=0) and the maximum position (N=$N_{END}$) and calibrate the standard output of the hall sensor portion (50) predetermined to the memory (120). And if the value is same, the S230 step is performed.

As occasion demands the control portion (100) judge the same if the real output and standard output is in the range of the predetermined range besides this embodiment.

In calibrating method this embodiment assume output of the hall sensor portion (50) is changed linearly as the position of the lens module (10). So the standard output is increased and decreased to difference of real output and standard output in N=0 position. But in case output of the hall sensor portion (50) is changed not linearly as the position of the lens module (10), is desirable to be considered at this point.

In the second method explain that S1200 and S1220 are performed at the position N=0, But in the first method explained as above mentioned as occasion demands above step is performed at another position.

In S1200 step and S1220 step meet the S200 step of the first method. The auto focus function is to be performed considering the fabricate variation and the assembly variation of component of respective article to control the focus precisely The output of the hall sensor is saved as standard output in the memory (120) because respective component is fabricated and assembled in specific size.

But respective article have the fabricate variation and the assembly variation, and in this case if the lens module is controlled as saved standard output standard output of the hall sensor portion (50) and real output is different and the control portion (100) is not detect it. As a result it is judged to error, and the yield is decreased in manufacturing line.

Accordingly in case the auto focus function control method is adapted in this embodiment the fabricate variation and the assembly variation is considered performing auto focus function in S1200 step and S1220 step, as a result expense to inspect quality in manufacturing line and error ratio is decreased and the yield in manufacturing line is improved.

In another step after S1220 step the method is same as the first method, but is only differ that respective standard output is saved in the memory.

In this embodiment as shown FIG. 1 and FIG. 3 the camera and the method for controlling of auto focus for example. But in this embodiment the method for controlling of auto focus is not defined, is adapted for focus control of the optical device including the lens module and drive portion of the lens module without departing from the spirit and scope of the invention.

In this embodiment drive portion is explained as VCM for example, but in this embodiment the method for controlling of auto focus is not defined and piezo motor (ultrasonic motor) is adapted for drive portion. In this embodiment the control of driving force is control the magnitude of the current. And depended on the drive portion driving portion is controlled to change voltage or frequency.

Figure 9:
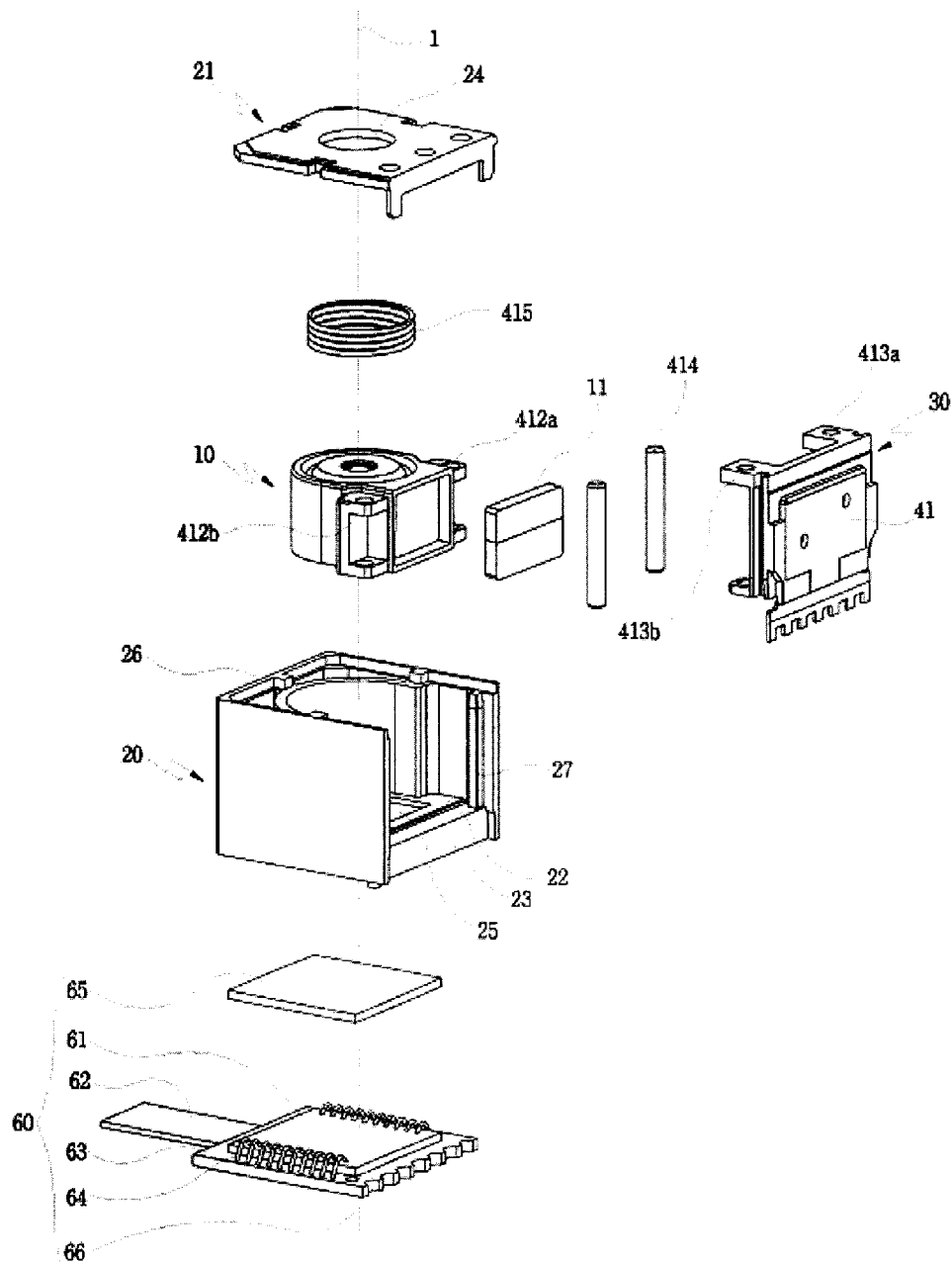
FIG. 9 is a exploded perspective view a camera system composition according to according to the second embodiment of the present invention.

Hereinafter the camera according to the second method in the first embodiment of the present invention is described as illustrated in FIG. 9. The camera illustrated in FIG. 9 adapt for guide bar (414) to decrease friction force in moving the lens module and is numbered same number as same component in the first embodiment.

The first projection (412) shaped plate having the first guide bar hall (412a) is formed at the both side reclaimed the magnet (11) in the lens module (10) and The second projection (413b) shaped plate having the second guide bar hall (413a) is formed at confronting position in the support panel (30). In this embodiment the first projection and the second projection is formed at respective the upper part and the lower part in a pair.

In case the lens module (10) and the support panel (30) are assembled a pair of the first projection (412b) is inserted between the second projection (413b) and the center of them are to be in a line and the lens module (10) and the support panel (30) is assembled. At this time it is desirable for the second guide bar hall in the lower part not to penetrate.

In the second embodiment as the first embodiment the first projection and the second projection is leaved space the lens module (10) and the drive portion (40) not to contact.

As the above structure the lens module (10) is restricted moving up and down, and driving force of the lens module (10) is decreased.

The resilient member (425) is equipped between the lens module (10) and the first hosing cover (21) to contact the upper part of the first projection and the upper part of the second projection in a initial state the current not to be applied to the coil (40b)

another construction and control method besides above mentioned is not explain as the same to the first embodiment.

INDUSTRIAL APPLICABILITY

As described the camera and the auto focus control method of the present invention is adapted to the telecommunication handset because the position of the lens module is controlled precisely corresponding any case such as the gravity effected from moving of the lens module according to the shooting angle in a same article and the state of the fabricating and assembly. Accordingly the camera is adapted to the optical device such as the digital camera.

The camera and the auto focus control method of the present invention can decrease the time to detect the focus position. And the camera is adapted to the camera requiring for decrease the photograph time because of not performing the complicated calculating and quickly converging to the control position of the lens module to control the current applied to the drive portion to compare the standard output of the position sensor and the real output.

The invention claimed is:
1. A camera system comprising:
a lens module capable of movement;
a drive portion generating driving force to move said lens module;
a position sensor portion detecting a position of the lens module and outputting the detected position as an electrical signal;
an image sensor portion outputting an image of a subject captured through the lens module as an electrical signal; and a control portion determining a focus position of the subject from the output of the image sensor portion, calculating a difference between a real output of the position sensor portion corresponding to the determined focus position and a standard output of the position sensor portion corresponding to the determined focus position, and controlling the magnitude of the driving force according to the difference, wherein the standard output of the position sensor portion is a predetermined standard output previously stored in a memory and corresponding to the determined focus position.

2. The camera system of claim 1, wherein the control portion is integrated into one chip together with the position sensor portion, and controls the magnitude of the driving force by controlling the strength of power applied to the drive portion.

3. A camera system comprising:

a lens module capable of linear movement in a direction of an optical axis;

a drive portion generating a driving force to move the lens module;

a position sensor portion detecting a position of the lens module and outputting the detected position as an electrical signal;

an image sensor portion outputting an image of a subject captured through the lens module as an electrical signal; and a control portion determining a focus position of the subject from the output of the image sensor portion, comparing a real output of the position sensor portion corresponding to the determined focus position and a standard output of the position sensor portion corresponding to the determined focus position to determine whether the lens module is correctly situated in the focus position, and controlling the magnitude of the driving force according to the determination result, wherein the standard output of the position sensor portion is a predetermined standard output previously stored in a memory and corresponding to the determined focus position.

4. The camera system of claim 3, further comprising a housing having a space for accommodating the lens module, the drive portion, and the position sensor portion, wherein the control portion is integrated into one chip together with the position sensor portion and is accommodated in the housing.

5. The camera system of claim 4, wherein the housing comprises a first housing forming a space for accommodating the lens module, the drive portion, and the position sensor portion and a second housing forming a space for accommodating the image sensor portion, and the second housing is situated on the lower part of the first housing such that the lens module and the image sensor portion are aligned with the optical axis, and an opening is formed on each of an upper surface and a lower surface of the first housing and an upper surface of the second housing to provide a shooting route of the image sensor portion.

6. The camera system of claim 5, wherein at least one first guide member is arranged on a side surface of the lens module having a magnetic for guiding movement of the lens module in the direction of the optical axis and at least one second guide member is arranged at a position corresponding to the first guide member on an inner side surface of the first housing having a coil, a concave extending in the direction of the optical axis is formed in the first guide member and the second guide member, a stopper is provided in an upper part and a lower part of the second guide member to limit a movement range of the lens module between a maximum position and an initial position, and at least one ball is inserted between the first guide member and the second guide member to roll in the direction of the optical axis by contacting the concave, and a first penetrating hole and a second penetrating hole are formed in the first guide portion and the second guide portion, respectively, and the lens module is coupled to the first housing by a guide bar inserted into the first penetrating hole and the second penetrating hole such that the lens module moves along the guide bar in the direction of the optical axis.

7. An auto focus control method for a camera which comprises a lens module and an image sensor portion for outputting an image of a subject captured by the lens module as an electrical signal, the auto focus control method comprising:

a first step of determining a focus position of the subject; and a second step of comparing a real output of a position sensor detecting a position of the lens module with a standard output of the position sensor corresponding to the focus position while moving the lens module to the determined focus position to determine whether the lens module is correctly situated in the focus position, and controlling the position of the lens module according to the determination result, wherein the first step further comprises determining an output of the image sensor portion while moving the lens module to any one of a plurality of lens module positions including an initial position and a maximum position of the lens module according to a set order previously stored in a memory, and detecting a lens module position matched to the focus of the subject as the focus position, wherein the standard output of the position sensor is a predetermined standard output previously stored in a memory and corresponding to the determined focus position.

8. The auto focus control method of claim 7, further comprising a third step of repeatedly determining whether the lens module is correctly situated in the focus position while moving the lens module by a set distance until the lens module is correctly situated in the focus position if the lens module is not correctly situated in the focus position.

* * * * *